United States Patent [19]

Burry

[11] 4,417,750
[45] Nov. 29, 1983

[54] OCCUPANT RESTRAINT SYSTEM

[75] Inventor: Donald L. Burry, Royal Oak, Mich.

[73] Assignee: General Motors Corporation, Detroit, Mich.

[21] Appl. No.: 294,211

[22] Filed: Aug. 17, 1981

[51] Int. Cl.³ .............................................. B60R 21/08
[52] U.S. Cl. .................................................... 280/753
[58] Field of Search ............... 280/753, 751, 752, 748, 280/749; 296/84 K

[56] References Cited
U.S. PATENT DOCUMENTS

| 3,188,112 | 6/1965 | Oelkrug | 280/751 |
| 3,545,789 | 12/1970 | Graham | 280/753 |
| 3,938,825 | 2/1976 | Boswell | 280/753 |

Primary Examiner—David M. Mitchell
Attorney, Agent, or Firm—Edward J. Biskup

[57] ABSTRACT

An occupant restraint system which includes a torso-pad and a knee-pad both of which generally conform to and blend with the configuration of a vehicle instrument panel and are interconnected in a manner whereby forceful movement of the knee-pad in a forward direction results in automatic movement of the torso-pad rearwardly towards the passenger seat.

2 Claims, 6 Drawing Figures

OCCUPANT RESTRAINT SYSTEM

This invention concerns an occupant restraint system for an automotive vehicle that normally forms a portion of the instrument panel and moves toward the passenger to cushion forward movement thereof during sudden deceleration of the vehicle.

More specifically, the occupant restraint system according to the present invention includes an upper torso-pad and a lower knee-pad which are integrated with and form a part of the instrument panel located in front of the passenger seat. In one form of the invention, a linkage interconnects the lower knee-pad to the upper torso-pad, and both of the pads are supported by suitable structures for movement in opposite directions. The linkage and the supporting structure are arranged so that during a collision the knees of the occupant seated in the passenger seat will initially impact against the lower knee-pad, causing it to be moved forwardly. This forward movement of the lower knee-pad then acts through the linkage to cause the upper torso-pad to be moved toward the torso of the occupant and restrain forward movement thereof.

The objects of the present invention are: to provide a new and improved occupant restraint system for a vehicle that forms a part of the instrument panel and that utilizes the passenger's energy created during sudden deceleration of the vehicle to move a torso-pad toward the passenger to restrain forward movement thereof; to provide a new and improved occupant restraint system which includes a torso-pad and a knee-pad both of which generally conform to and blend with the configuration of a vehicle instrument panel and are interconnected in a manner whereby forceful movement of the knee-pad in a forward direction results in the automatic movement of the torso-pad rearwardly toward the passenger seat; and to provide a new and improved occupant restraint system which is recessed within a vehicle instrument panel opposite the passenger seat and includes a lower knee-pad and an upper torso-pad interconnected through a pivotally supported member which imparts rearward movement to the torso-pad when the knee-pad is forceably struck by the knees of the passenger.

These and other objects of the present invention will be apparent from the following detailed description, taken in conjunction with the accompanying drawings, wherein.

Figure 1:
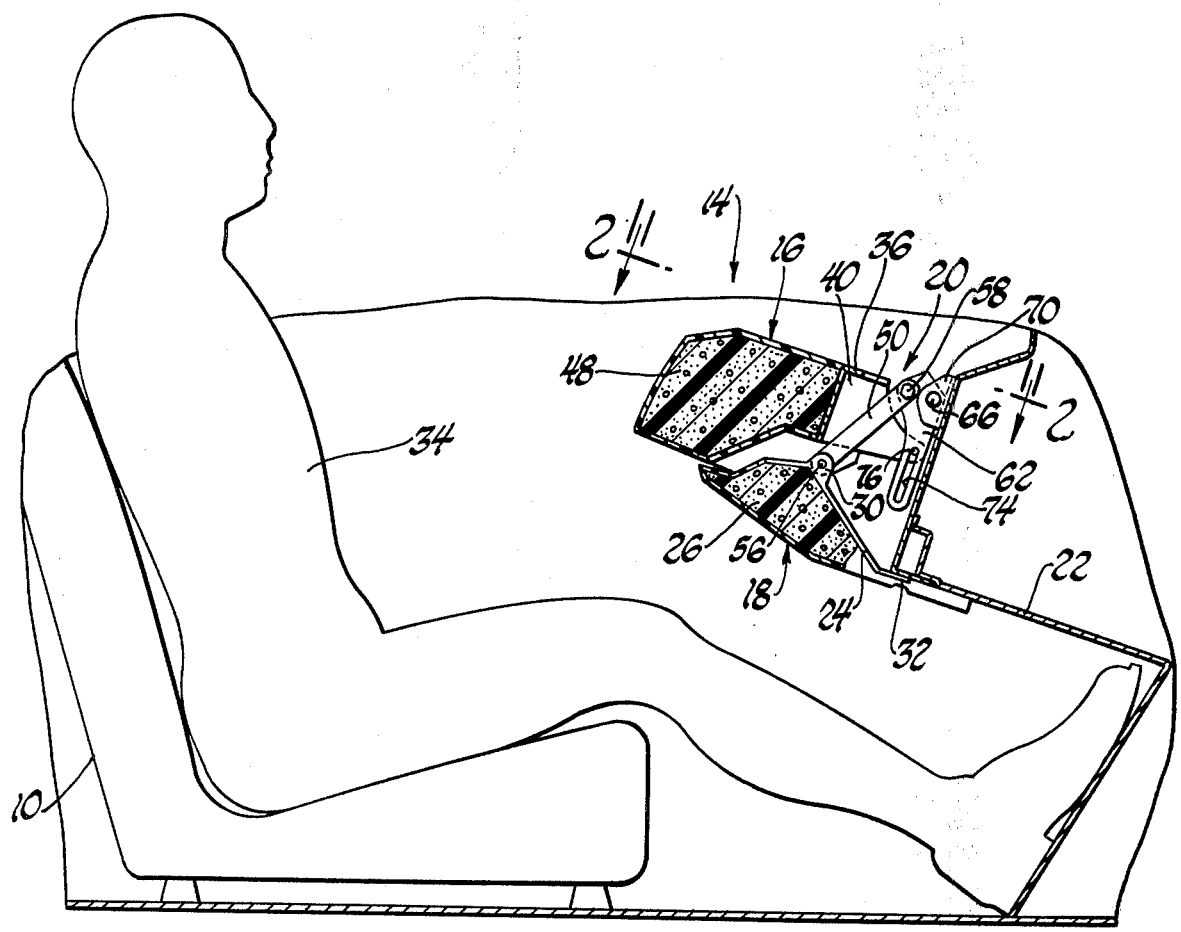
FIG. 1 is a side elevational view showing an occupant restraint system made in accordance with the present invention and recessed within a motor vehicle instrument panel.
Figure 2:
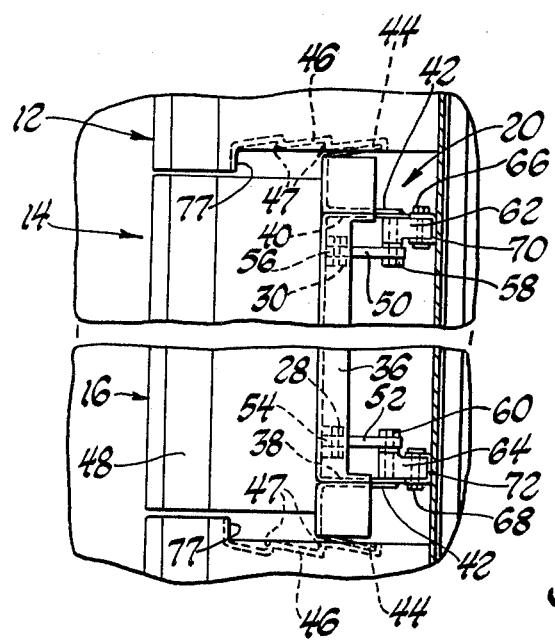
FIG. 2 is a plan view of the occupant restraint system taken on line 2—2 of FIG. 1.

Referring to the drawings and more particularly to FIGS. 1 and 2 thereof, the passenger compartment of a motor vehicle is shown including a passenger seat 10 located opposite the vehicle instrument panel 12. The instrument panel 12 has an occupant restraint system 14 made in accordance with the present invention mounted therein that generally comprises an upper torso-pad 16, a lower knee-pad 18, and an actuator mechanism 20. Both the torso-pad 16 and the knee-pad 18 are designed so as to conform to and blend with the instrument panel 12 and are supported together with the actuator mechanism 20 by a firewall 22 of the motor vehicle.

The knee-pad 18 comprises a metal backing plate 24 which has a formed cushion member 26 attached to the outer surface thereof. The inner surface of the backing plate 24 has a pair of identical and laterally spaced ears 28 and 30 rigidly secured thereto which connect with the actuator mechanism 20 to be hereinafter described. The forward end 32 of the backing plate 24 along its entire length is secured to a portion of the firewall 22 and serves a a horizontal hinge about which the knee-pad 18 can pivot when struck by the knees of the passenger 34 seated in the passenger seat 10, as seen in FIG. 1.

The torso-pad 16 includes an L-shaped backing plate 36, the opposite side edges of which are rigid with a pair of side walls 38 and 40. Fixed with each side wall 38 and 40 is a metal bracket 42 formed with a laterally outwardly extending resilient tongue 44 which is located within a guide-track 46 made of metal and secured to be adjacent side wall of the instrument panel 12. Each guide-track 46 is formed with a pair of stop surfaces each of which is identified by the reference numeral 47. As in the case with the knee-pad 18, the outer surface of the backing plate 36 has a formed cushion 48 attached thereto which, as seen in FIG. 1, projects rearwardly and is designed so as to blend with the finished outer surface of the cushion 26 of the knee-pad 18.

The actuator mechanism 20 serves to interconnect the torso-pad 16 and the knee-pad 18 and, as best seen in FIGS. 1 and 2, includes a pair of identical links 50 and 52, the lower ends of which are connected by pivotal connections 54 and 56 to the ears 28 and 30 respectively formed on the backing plate 24 of the knee-pad 18. The upper ends of the links 50 and 52 are connected by pivotal connections 58 and 60 to a pair of identical cranks 62 and 64, respectively. The cranks 62 and 64, in turn, are connected by transversely and horizontally aligned pivotal connections 66 and 68 to a pair of brackets 70 and 72 respectively secured to an upper portion of the firewall 22. It will be noted that each crank 62 and 64 is formed with an elongated slot 74 which accommodates a pin 76 fixed to the associated side wall of the backing plate 36.

Figure 3:
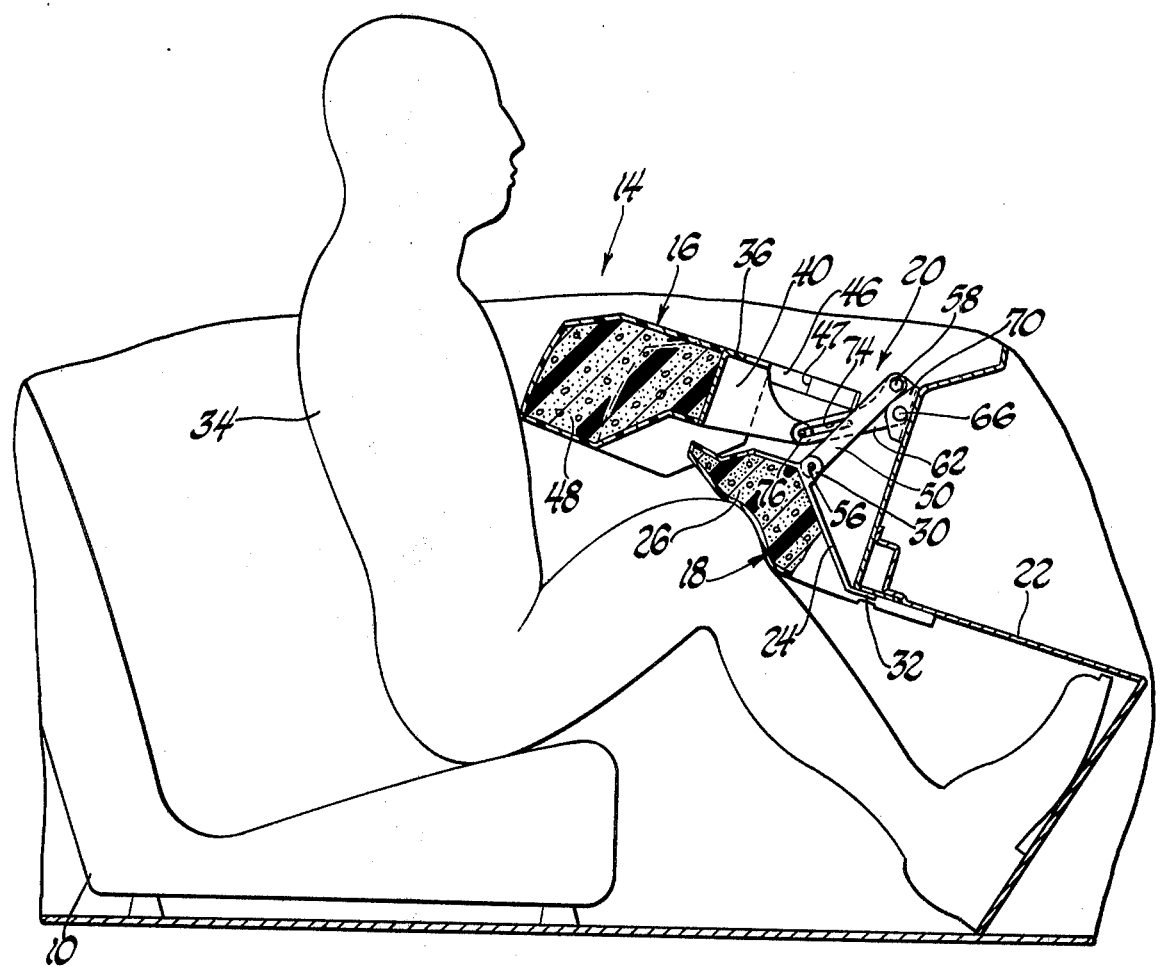
FIG. 3 is a view similar to FIG. 1, but illustrates the position assumed by the knee-pad and the torso-pad of the occupant restraint system when the knee-pad is struck by the knees of a passenger.

The occupant restraint system 14 described above operates as follows. When the motor vehicle is suddenly braked or involved in a frontal collision, the passenger 34 will move forwardly from the FIG. 1 position towards the instrument panel 12 causing the knees to raise upwardly and strike the cushion 26 of the knee-pad 18, as seen in FIG. 3. The impact of the knees against the knee-pad 18 will initially compress the cushion 26 which can be made of an energy-absorbing material. Continued forwardly and upwardly directed force application by the knees of the passenger 34 will result in the knee-pad 18 pivoting about the forward end 32 of the backing plate 24 in a clockwise direction to cause the links 50 and 52 to be moved upwardly. Inasmuch as the links 50 and 52 are connected to the cranks 62 and 64 by the pivotal connections 58 and 60, this upward movement results in the cranks 62 and 64 rotating about the aligned pivotal connections 66 and 68 in a clockwise direction with resultant rearward movement of the torso-pad 16 towards the passenger 34 until the bracket 42 along each side of the torso-pad 16 engages the shoulders 77 formed in the instrument panel 12. As the torso-pad 16 moves rearwardly, the tongue 44 formed with each bracket 42 attached to the backing plate 36 cooperates with the stop surface 47 in the associated guide-track 46 for locking the torso-pad 16 in a fully extended rearward position shown in FIG. 3 to prevent forward movement of the torso-pad 16 when the passenger's torso impacts against the torso-pad 16.

Figure 4:
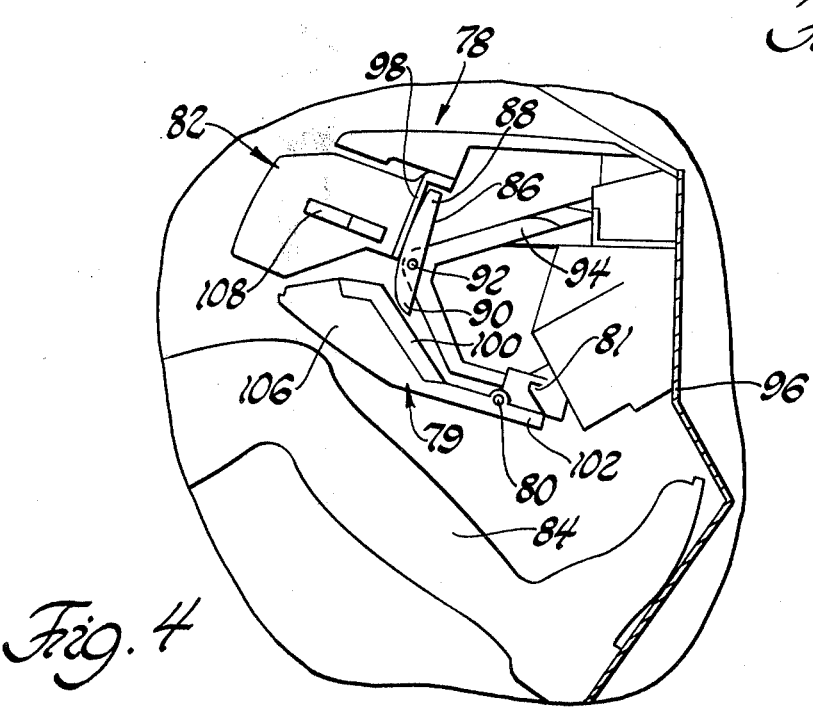
FIG. 4 is a side elevational view of a modified form of the occupant restraint system shown in FIGS. 1 through 3.
Figure 5:
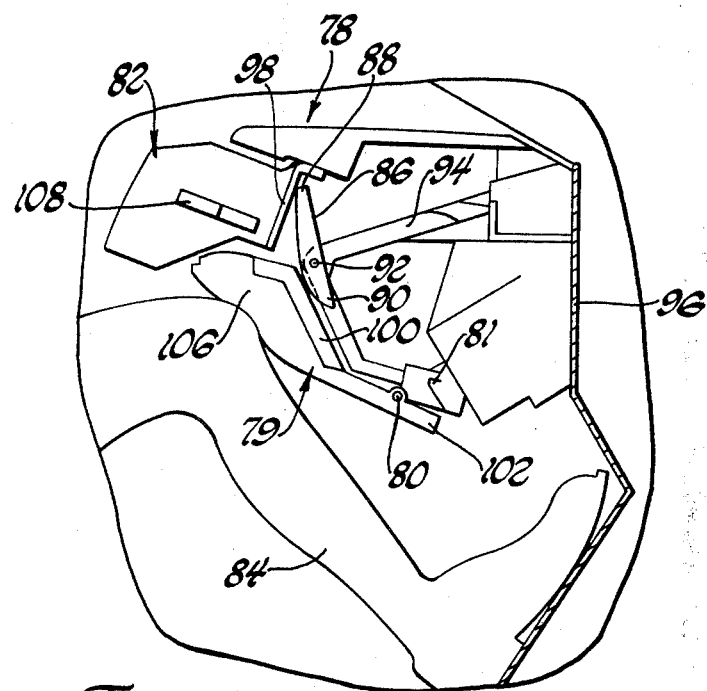
FIG. 5 is a view similar to that shown in FIG. 4 of the modified form of the occupant restraint system, but shows the position assumed by the torso-pad and the knee-pad when contact between the torso-pad and the passenger's knees occurs.
Figure 6:
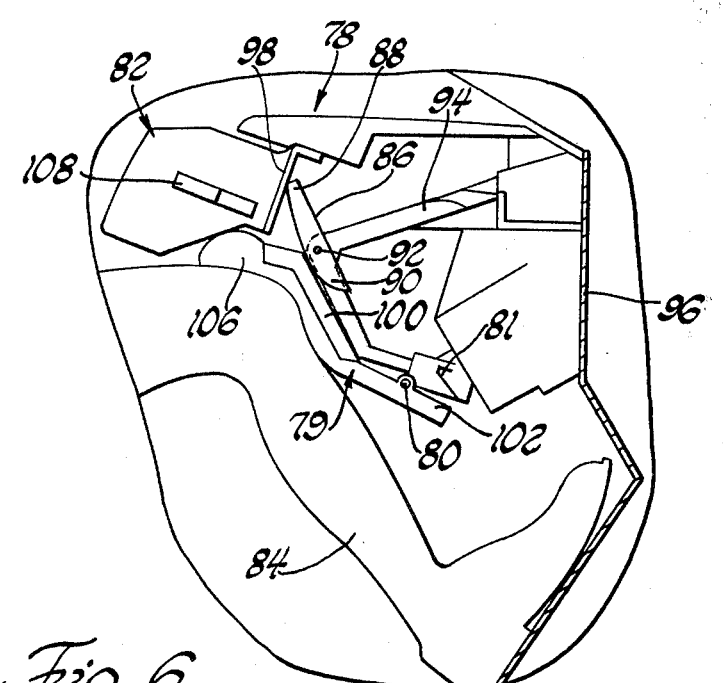
FIG. 6 is a view similar to that shown in FIG. 5, but shows the knee-pad crushed by the passenger's knees.

FIGS. 4 through 6 show an occupant restraint system 78 modified form of the occupant restraint system 14 shown in FIGS. 1 through 3. As in the case of the occupant restraint system 14 shown in FIGS. 1 through 3, a knee-pad 79 is provided, the forward end of which is connected by a transversely extending horizontal pivotal connection 80 to a fixed bracket 81. In addition, a torso-pad 82 is provided which is supported by suitable means (not shown) for rearward guided movement towards the passenger 84. Rather than utilizing an actuator mechanism in the form of a linkage as employed by the occupant restraint system 14 of FIGS. 1 through 3, in this instance a lever 86 is provided which is pivotally supported intermediate its upper and lower ends 88 and 90 respectively by a pivotal connection 92 connected to a C-shaped support frame 94 rigid with the firewall 96 of the vehicle. FIG. 4 shows the various parts of the occupant restraint system 78 in the normal positions prior to being struck by the knees of the passenger 84. In the normal position, the torso-pad 82 is located in its forward extreme position with the backing plate 98 thereof engaging the upper end 88 of the lever 86. Also, the knee-pad 79 is located with its backing plate 100 adjacent the lower end 90 of the lever 86 and is maintained in this position by the engagement of an extension 102, formed with the forward end of the knee-pad 79, with the bracket 81.

During sudden deceleration of the vehicle, the knees of the passenger 84 will strike the cushion-portion 106 of the knee-pad 79 and cause the knee-pad 79 to pivot in a clockwise direction about the pivotal connection 80. The backing plate 100 of the knee-pad 79, in turn, will cause the lower end 90 of the lever 86 to rotate in a counterclockwise direction about the pivotal connection 92 and, at the same time, cause the upper end 88 of the lever 86 to move the torso-pad 82 rearwardly toward the passenger 84, as seen in FIG. 5. This movement of the lever 86 will continue until the torso-pad 82 and the knee-pad 79 assume the positions shown in FIG. 6. It will be noted that as in the case with the torso-pad 16 of the occupant restraint system 14, each side of the torso-pad 82 is formed with a laterally extending resilient tongue 108 or the like which is adapted to move within a guide-track (not shown) for the purpose of engaging a stop surface formed therein for locking the torso-pad 82 in the extended position shown in FIG. 6.

Various changes and modifications can be made in this construction without departing from the spirit of the invention. Such changes and modifications are contemplated by the inventor, and he does not wish to be limited except by the scope of the appended claims.

The embodiments of the invention for which an exclusive property or privilege is claimed are defined as follows:

1. An occupant restraint system adapted to be combined with the instrument panel of an automotive vehicle and located in front of a seated passenger, said occupant restraint system comprising a torso-pad supported within a guide track formed in said instrument panel for movement between a first position wherein said torso-pad is in line with the upper portion of said instrument panel and a second position wherein said torso-pad is extended outwardly from said instrument panel towards said seated passenger and maintained in a fixed position for receiving the impact of the torso of said seated passenger; a knee-pad forming a lower portion of said instrument panel, hinge means supporting a lower portion said knee-pad for pivotal movement in a direction away from said seated passenger when the knees of said seated passenger impact against said knee-pad at a point higher than said hinge means during sudden deceleration of said automotive vehicle said knee-pad moves toward said instrument panel; actuator means operatively interconnecting said torso-pad to said knee-pad whereby movement of said knee-pad in said direction away from said seated passenger causes said torso-pad to move from said first position to said second position; and cooperating locking means carried by said torso-pad and said track for maintaining said torso-pad in said second position when said torso of said seated passenger impacts against said torso-pad so as to prevent the impact of said torso against said torso-pad from acting through said actuator means to move said knee-pad.

2. An occupant restraint system adapted to be combined with the instrument panel of an automotive vehicle and located in front of a seated passenger, said occupant restraint system comprising a torso-pad supported within a stepped guide track formed in said instrument panel for movement between a first position wherein said torso-pad is in line with the upper portion of said instrument panel and a second position wherein said torso-pad is extended outwardly from said instrument panel towards said seated passenger and maintained in a fixed position for receiving the impact of the torso of said seated passenger; a knee-pad forming a lower portion of said instrument panel, hinge means supporting a lower portion said knee-pad for movement in a direction away from said seated passenger so when the knees of said seated passenger impact against said knee-pad at a point higher than said hinge means during sudden deceleration of said automotive vehicle said knee-pad moves toward said instrument panel; an actuator mechanism including a pivoted lever operatively interconnecting said torso-pad to said knee-pad whereby movement of said knee-pad in said direction away from said seated passenger causes said torso-pad to move from said first position to said second position; and locking means in the form of a resilient tongue carried by said torso-pad cooperating with said stepped guide track formed in said instrument panel for maintaining said torso-pad in said second position when said torso of said seated passenger impacts against said torso-pad so as to prevent the impact of said torso against said torso-pad from acting through said actuator mechanism to move said knee-pad.

* * * * *

UNITED STATES PATENT AND TRADEMARK OFFICE
CERTIFICATE OF CORRECTION

PATENT NO. : 4,417,750

DATED : November 29, 1983

INVENTOR(S) : Donald L. Burry

It is certified that error appears in the above—identified patent and that said Letters Patent is hereby corrected as shown below:

Column 4, line 17, after "portion" insert -- of --.

Column 4, line 19, after "passenger" insert -- so --.

Column 4, line 49, after "portion" insert -- of --.

Signed and Sealed this

Twentieth Day of November 1984

[SEAL]

Attest:

GERALD J. MOSSINGHOFF

Attesting Officer

Commissioner of Patents and Trademarks